United States Patent [19]

Peterson

[11] Patent Number: 4,739,667
[45] Date of Patent: Apr. 26, 1988

[54] POWER TRANSMISSION WITH VARIABLE LENGTH LEVER

[76] Inventor: Walter O. Peterson, International School of Prague, c/o American Embassy, Department of State, Washington, D.C. 20520-5630

[21] Appl. No.: 900,432

[22] Filed: Aug. 26, 1986

[51] Int. Cl.$^4$ ............... F16H 25/10; F16H 29/08; F16H 29/20
[52] U.S. Cl. .......................................... 74/53; 74/119; 74/121; 74/123; 74/834
[58] Field of Search ................ 74/53, 119, 121, 123, 74/834

[56] References Cited

U.S. PATENT DOCUMENTS

| | | |
|---|---|---|
| 300,734 | 6/1884 | Preston . |
| 491,759 | 2/1893 | Prouty .................. 74/119 |
| 662,455 | 11/1900 | Messerer ................ 74/119 |
| 887,785 | 5/1908 | Gauntt . |
| 1,401,538 | 12/1921 | Kessler ................. 74/119 |
| 1,413,114 | 4/1922 | Haustgen . |
| 1,431,647 | 10/1922 | Frey . |
| 1,441,256 | 1/1923 | Wilcox ................. 74/53 |
| 1,508,220 | 9/1924 | Frey . |
| 2,254,195 | 8/1941 | Cicin .................. 74/119 |
| 2,873,611 | 2/1959 | Biermann .............. 74/40 |
| 2,935,385 | 5/1980 | Cornelison ........... 74/119 X |
| 3,224,284 | 12/1965 | McElhenny ........... 74/119 |
| 3,646,822 | 3/1972 | Pocaterra ............. 74/53 |
| 3,888,512 | 6/1975 | Peterson ............. 280/255 |
| 4,109,539 | 8/1978 | Feleus . |
| 4,182,203 | 1/1980 | Drury ................. 74/834 |
| 4,235,130 | 11/1980 | Dulger ............... 74/831 |
| 4,565,105 | 1/1986 | Peterson ............. 74/119 |

FOREIGN PATENT DOCUMENTS

| | | | |
|---|---|---|---|
| 287419 | 9/1915 | Fed. Rep. of Germany ........ 74/119 |
| 302523 | 10/1932 | Italy ................................... 74/119 |
| 566620 | 9/1957 | Italy ................................... 74/119 |
| 52-19865 | 2/1977 | Japan .................................. 74/834 |

Primary Examiner—Allan D. Herrmann
Attorney, Agent, or Firm—Klarquist, Sparkman, Campbell, Leigh & Whinston

[57] ABSTRACT

A power transmission apparatus transmits power from a rotatable cam to an output mechanism. A variable length lever, comprised of first and second lever sections, is pivoted to a lever support by a fulcrum. The lever sections telescopingly or otherwise interconnected to allow the over-all length of the lever to vary. In addition, the first lever section includes a cam following end portion which is drivenly coupled to the cam. Also, the second lever section has an output end portion which is pivoted to the output mechanism. The lever oscillates when the cam following end portion is driven by the cam and drives the output mechanism. A drive adjustment device moves the fulcrum relative to the cam following and output end portions of the first and second lever sections. This varies the throw of the output end portion with the zero drive being possible. The travel of the cam following end portion is restricted to a first line and the travel of the output end portion is restricted to a second line parallel to and spaced from the first line. To increase the compactness of the apparatus, this first line may be parallel to the plane of rotation of the cam with the lever being angled outwardly from such plane of rotation. A biasing mechanism, which may be internal to the lever sections, urges the cam following and output end portions away from one another.

21 Claims, 2 Drawing Sheets

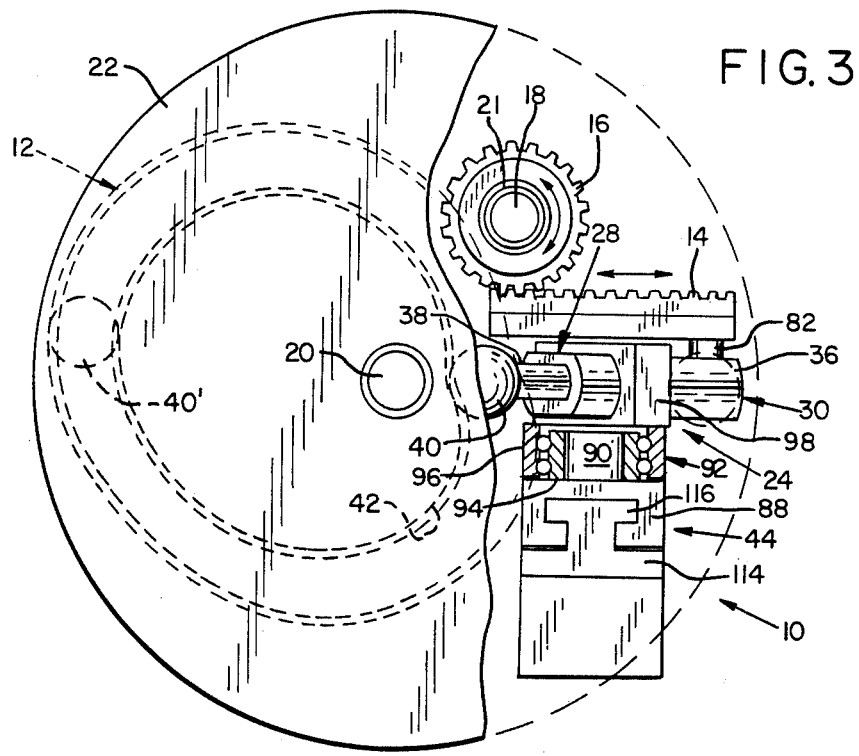
FIG. 3
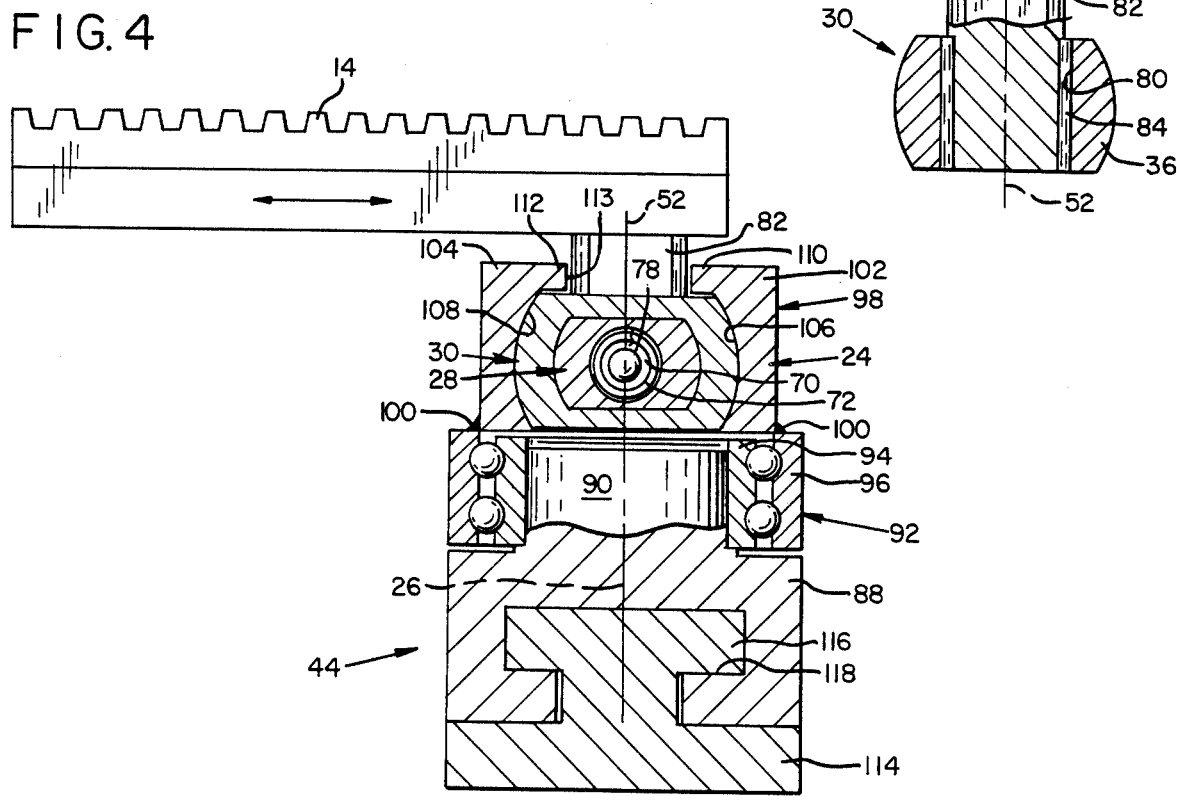
FIG. 5
FIG. 4

POWER TRANSMISSION WITH VARIABLE LENGTH LEVER

BACKGROUND OF THE INVENTION

1. Field of the Invention

The present invention relates generally to power transmissions and more specifically to continuously variable mechanical power transmissions.

2. Description of the Prior Art

A typical prior mechanical transmission is the sliding gear (standard) transmission. This standard transmission changes the input to output speed ratio in steps by manually changing gears. Power sources typically operate only over a small speed range with good economy and power. Therefore, a large number of gear changes are required for efficient operation. As an example, some trucks have numerous forward gears.

In addition to the standard transmission, certain stepless mechanical transmissions are also known.

One such device is disclosed in U.S. Pat. No. 4,565,105 of Peterson. In Peterson, a power transmission apparatus is disclosed for transmitting power from a reciprocable drive rod to a reciprocable output rod. This transmission includes a lever support, a fixed-length lever, and a fulcrum fixed to the lever for pivoting the lever to the lever support at a fixed location intermediate the end portions of the lever. One end portion of the lever is adapted for slidable connection to an end portion of the drive rod while another end portion of the lever is adapted for slidable connection to an end portion of the output rod. Also, a drive adjustment mechanism is included for shifting the lever support, and thereby the lever, relative to the input and output rods. This varies the throw of the output rods in response to reciprocations of the drive rod. To adjust this power transmission, the entire lever and fulcrum assembly is moved relative to the input and output loads. The fulcrum assembly is movable to a zero drive position in which the output rod remains stationary even as the input rod is driven.

Although offering a number of advantages, this prior Peterson transmission also suffers from a number of drawbacks. For example, the use of reciprocable input and output rods, as well as a fixed length lever, limits the ability to make the transmission compact. This is further compounded by the fact that the ends of the lever are shifted significantly beyond the locations which the lever is coupled to the drive and output rods during varying of the drive ratio of the transmission. Therefore, the transmission must be sized large enough to accommodate the ends of the levers during such shifting. Moreover, the drive rod extends outwardly from a cam which drives the rod and in a direction generally parallel to the plane of the cam. This also adds to the size of the transmission.

A still further device is disclosed in U.S. Pat. No. 1,401,538 of Kessler. In Kessler, a lever is pivoted at one end to a support and at its other end to a drive rod so that reciprocations of the drive rod cause the lever to oscillate. An output rod is provided and is slidably mounted to the lever intermediate its ends. As the lever support is raised and lowered, the lever slides relative to the output shaft. This movement of the support changes the output of the transmission by adjusting the throw of the output shaft.

Another prior art transmission device is shown in U.S. Pat. No. 491,759 of Prouty. In Prouty, a drive rod is pivoted to one end of a lever, which in turn is pivoted to a frame. An output rod has one end slidably connected to the lever. As this one end of the output rod is slid closer to and further from the lever pivot, the throw of the output rod is varied. In Prouty, the output rod is coupled to the lever for sliding to locations along the lever. The output rod is slidable from a position aligned with the pivot of the lever for zero output to other positions closer to the pivotal connection of the drive rod to the lever.

Still another existing device is shown in U.S. Pat. No. 2,254,195 of Cicin. Cicin includes a drive rod which reciprocates linearly and which is slidably connected to one end of the lever. An output rod has one end pivoted to the other end of the lever. The lever is slidably connected to a pivot and oscillates about this pivot. The pivot is movable from a position aligned with the output rod, in which case the output rod remains stationery as the input rod is driven, to various other positions along the lever. An adjustment mechanism is provided for shifting the pivot along the length of the lever. At the pivot, stresses on the lever are higher. Thus, to withstand certain loads, reinforcement of the lever along its entire length is indicated. This adds to the weight of the lever.

Therefore, although prior art variable transmission devices are known, a need exists for an improved, continuously variable, power transmission.

SUMMARY OF THE INVENTION

In accordance with the invention, a power transmission apparatus is disclosed for transmitting power from a rotatable cam to an output mechanism such as a gear rack. The transmission includes lever support means. A variable length lever means, comprised of first and second lever sections, is pivoted to the lever support means by a fulcrum means. The first and second lever sections have respective first end portions which are interconnected to allow the over-all length of the lever means to vary during operation of the power transmission. In addition, the first lever section includes a cam following end portion which is drivenly coupled to the cam. Also, the second lever section has an output end portion which is coupled to the rack or other output mechanism. The lever oscillates when the cam following end portion is driven by the cam to, in turn, drive the output mechanism. Additionally, a drive adjustment means moves the fulcrum relative to the cam following and output end portions of the first and second lever sections. This varies the throw of the output end portion of the second lever section as the lever means is driven by the cam.

As a more specific aspect of the invention, the first and second lever sections are slidably interconnected to permit the lever means to vary in length during operation of the transmission. In an illustrated form of the invention, the lever sections are telescopically interconnected.

As a further aspect of the invention, a biasing mechanism is provided for urging the cam following and output end portions away from one another. This minimizes noise, vibration and harshness of the transmission. In one specific embodiment the first and second lever sections define an internal chamber and the biasing mechanism comprises a coil spring positioned within this chamber.

As a further feature of the invention, the power transmission includes means for restricting the travel of the cam following end portion to a first line. Means are also provided for restricting the travel of the output end portion to a second line parallel to and spaced from the first line. To increase the compactness of the apparatus, this first line may be parallel to the plane of rotation of the cam and the lever means is angled outwardly from such plane of rotation.

As a still further aspect of the invention, the lever support means has a base and a fulcrum supporting rail projecting outwardly from the base. The fulcrum means includes a fulcrum supporting base with a rail receiving channel for slidably receiving the rail. Thus, the fulcrum is slidably coupled to the rail for shifting by a drive adjustment mechanism to various positions along the rail. This varies the throw of the output end portion in response to oscillations of the lever about the fulcrum pivot. Moreover, if zero output or drive is derived, the fulcrum pivot can be slid to a location which positions the fulcrum pivot in axial alignment with a pivoting coupling of the output end portion to the output mechanism.

It is accordingly one object of the invention to provide an improved power transmission apparatus.

Another object of the invention is to provide a power transmission apparatus capable of operating over a wide range of stepless speed changes.

It is still another object of the invention to provide a power transmission which converts rotations of an input cam to reciprocations of an output end section of a lever. Further, the movement of the output end portion is variable over a wide range, from zero to one or more, in response to revolutions of the input cam.

A still further object of the invention is to provide a power transmission apparatus of a design in which noise, vibrations and harshness are minimized.

Another object of the invention is to provide a power transmission apparatus of compact size and which is capable of operating at relatively high speeds.

A further object of the invention is to provide relatively efficient, reliable, lightweight, and rugged power transmission apparatus.

Another object of the present invention is to provide a power transmission apparatus which is capable of providing a high-torque output at a low output speed, especially where input power is limited, and which also provides a smooth power delivery.

These and other objects, features and advantages of the present invention will become apparent with reference to the following description and drawings.

BRIEF DESCRIPTION OF THE DRAWINGS

FIG. 3 is a partially broken away side elevational view of a power transmission in accordance with the present invention;

FIG. 4 is a vertical sectional view of a power transmission in accordance with the invention, taken along line 4—4 of FIG. 1; and FIG. 5 is a vertical sectional view of a power transmission in accordance with the present invention, taken along line 5—5 of FIG. 1.

DETAILED DESCRIPTION OF THE PREFERRED EMBODIMENT

Figure 1:
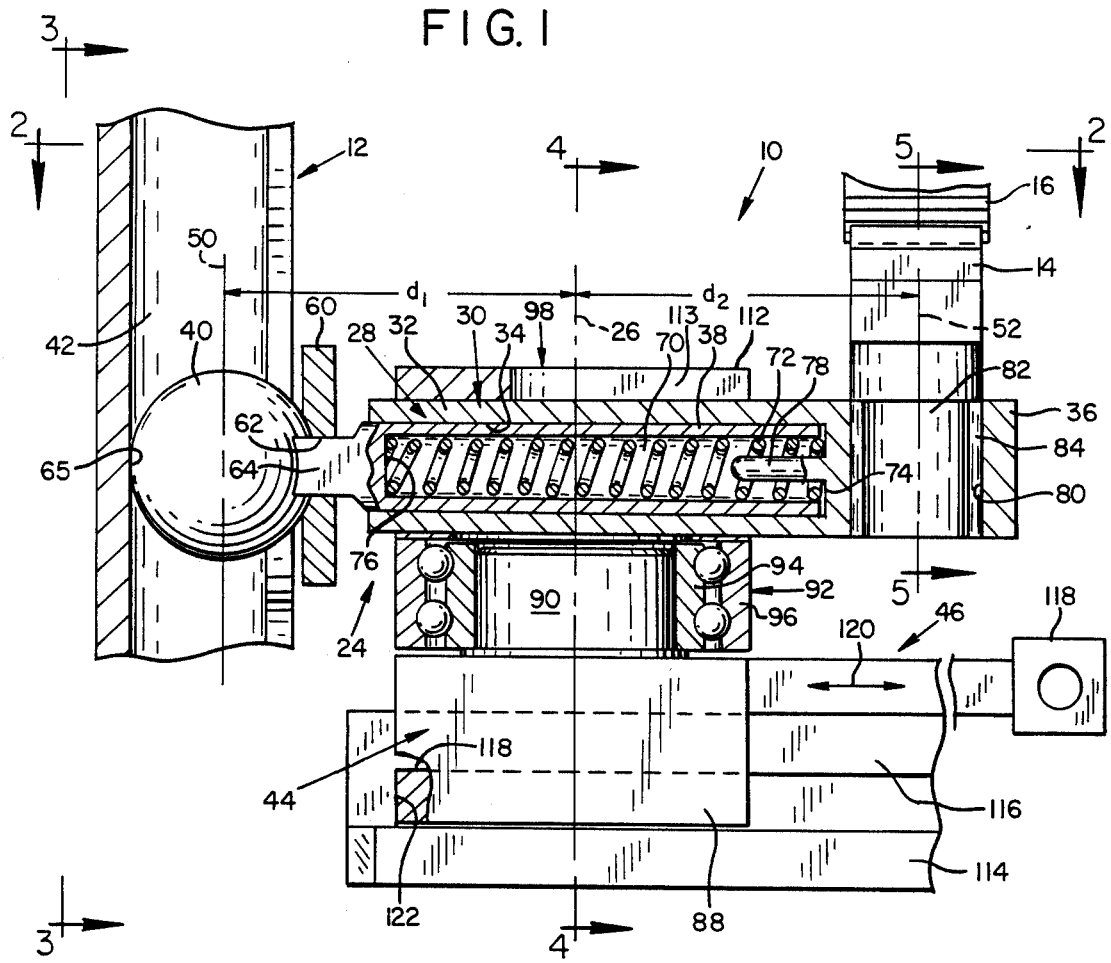
FIG. 1 comprises a vertical sectional view of a power transmission in accordance with the present invention.

With reference to FIGS. 1 and 3, a power transmission apparatus 10 in accordance with the invention is shown for transmitting power from a rotatable input cam 12 to an output mechanism, such as a reciprocable rack 14 engaged by a drive gear 16. Gear 16 is mounted to a conventional one way rachet or cam clutch mechanism on an output shaft 18. Input power is supplied to the transmission via a rotatable drive shaft 20, to which cam 12 is mounted. As explained below, the transmission is capable of continuously varying the speed of rotation of the output shaft 18 from zero to speeds at or above the speed of rotation of the input shaft 20. In addition, in a conventional manner utilizing gearing, shaft 18 may be driven in either direction by rack 14 for both forward and reverse movement. Any suitable output mechanism may, of course, be utilized, such as another cam instead of the rack 14. Still another output mechanism is illustrated in U.S. Pat. No. 4,565,105 of Peterson.

In general, the apparatus is contained within a housing 22 (FIG. 3), to which the output and input shafts 18, 20 are journalled. The input shaft 20 is adapted to be rotated by a motor or prime mover (not shown) to thereby drive the cam mechanism 12. The cam drives a lever assembly 24 and causes the lever to oscillate about a fulcrum pivot 26 (FIG. 1). The lever assembly 24 is constructed so as to vary in length as it oscillates during power transmission, as explained more fully below. In the illustrated form, lever assembly 24 is comprised of first and second slidably interconnected rigid, straight tubular lever sections 28, 30, which slide relative to one another during power transmission to thereby vary the over-all length of the lever assembly. More specifically, lever section 30 has a first end portion 32 which defines a hollow internal cylindrical chamber 34 and an output end section 36. Similarly, lever section 28 includes a first end section 38 sized for telescoping and slidable insertion within chamber 34 of lever section 30. Lever section 28 also includes a cam follower end portion 40, which may comprise a sphere, positioned within a race 42 of the cam 12.

The lever assembly 24 is pivoted to a lever supporting structure 44 for oscillating movement about the fulcrum pivot access 26 as cam follower 40 is driven by cam 12. A drive speed adjustment mechanism 46 is provide for shifting the lever supporting structure 44, and thereby the fulcrum pivot 26, relative to the respective outer ends of the lever assembly. Adjustment 46 is capable of continuously varying the distance $d_1$ (FIG. 1) relative to the distance $d_2$ to vary the output of the transmission. In this case, $d_1$ is the distance from the fulcrum pivot axis 26 to a location 50 at which drive forces are imparted to cam follower 40. Also, $d_2$ is the distance from the fulcrum pivot axis 26 to a pivot axis 52 about which the rack 14 or other output mechanism pivots relative to output end portion 36 as the lever section 30 oscillates. As a result of such shifting, the throw or distance through which the output end section 36 reciprocates in response to rotation of cam 12 is variable in a stepless fashion. Furthermore, the apparatus is designed so that the fulcrum pivot axis is movable into alignment with the pivot axis 52. When so positioned, the output rack remains stationary, even if the lever assembly is oscillating.

Figure 2:
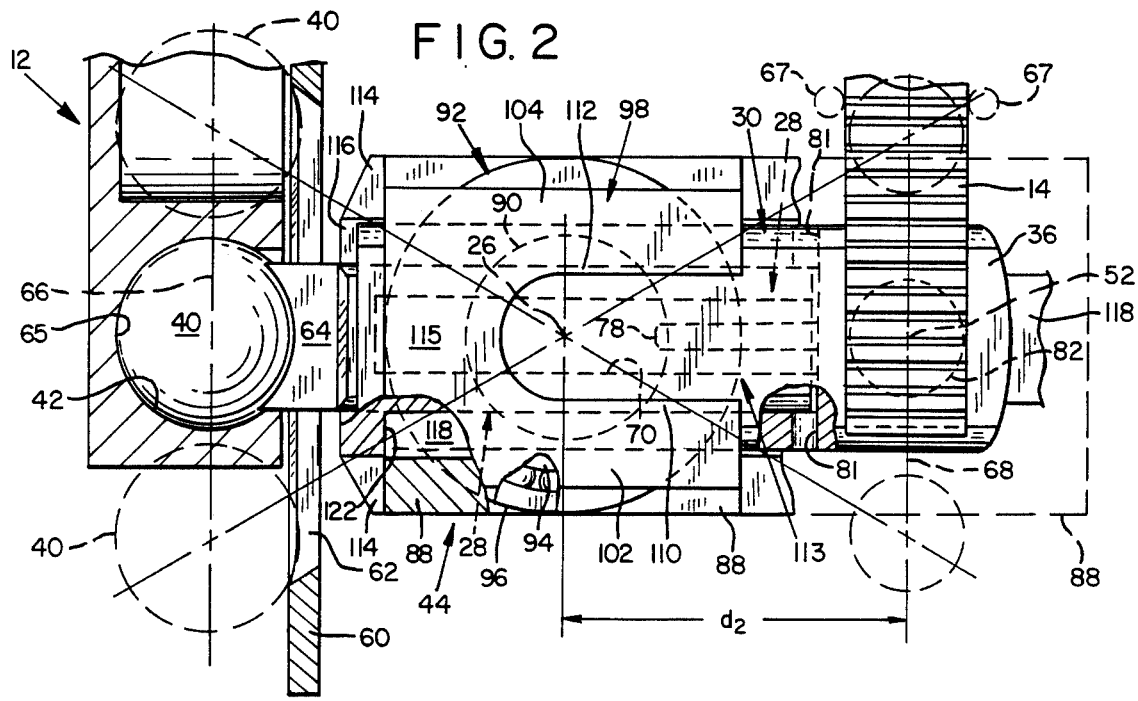
FIG. 2 is a partially broken away top plan view of a power transmission in accordance with the present invention.

With reference to FIG. 1, a guide means, such as a bar 60, is mounted to the transmission housing. This bar is provided with a slot 62 through which a neck 64 of lever section 28 extends. This guide mechanism, together with the opposed surface 65 of cam 12, restricts the travel of cam follower 40 to a straight line indicated as 66 in FIG. 2. Similarly, the rack 14 or other output mechanism is restricted by means mounted to the housing (shown schematically as guide posts 67) for travel along a line indicated at 68 in FIG. 2. To increase the smoothness of the power transmission and limit wobble that could otherwise result, the directions of travel 66, 68 are straight and parallel to one another. During power transmission, the length of the lever varies to accommodate variations in the distance between the location at which cam follower 40 engages the cam and the location at which output end portion 36 is coupled to the rack 14. Thus, as illustrated in FIG. 2, the transmission is extremely compact as the space needed for operation of the lever assembly is limited. Also, there is no need for the lever to shift beyond driving and driven points of the transmission during operation of the apparatus. Thus, the over-all dimensions of the transmission can be significantly reduced. Moreover, it is relatively easy to oscillate the lever assembly because it is lightweight and momentum buildup is reduced.

Also, the lever assembly is angled outwardly from the plane in which the cam 12 oscillates instead of projecting from the cam within this plane. This also facilitates the manufacture of a highly compact power transmission. Moreover, this transmission is extremely stable. This is because the respective ends of the lever assembly are restricted to move in straight-line paths, the tendency of driven and drive members to twist relative to one another is reduced.

To reduce noise, vibration and harshness of the transmission, a biasing mechanism is provided for biasing the outer ends 36, 40 of the lever sections away from one another. This reduces play in the couplings between the lever assembly and cam follower and between the lever assembly and output mechanism. As shown in FIGS. 1 and 4, in the illustrated embodiment the end section 38 of lever section 28 is also hollow and defines an internal spring receiving chamber 70. A biasing coil spring 72 is positioned within this chamber to urge the lever sections apart. As shown, one end of this spring bears against a base 74 of the chamber 34 of lever section 30 while the opposite end of the spring abuts a base 76 of the chamber 70. A spring retaining post 78 projects outwardly from base 74 within chamber 70. Spring 72 is placed on post 78 so as to minimize the possibility of the spring binding within the chamber. As shown in FIG. 2, lever section 30 is provided with an air escape apertures 81 adjacent the base 74. These apertures allow egress of air from and an influx of air into chamber 70 as the lever sections slide relative to one another.

With reference to FIGS. 1 and 5, one form of coupling is shown for connecting output section 36 of lever section 30 to the rack 14. In this form, an opening 80 is provided through output end section 36. A post or pin 82 extends downwardly from the underside of rack 14 and is positioned within opening 80. A bushing or bearing 84 retained within opening 80 journals post 82 to end section 36 for pivoting about pivot axis 52 during operation of the power transmission.

The lever supporting structure 44 will next be described with reference to FIGS. 1, 2 and 4. As can be seen in FIG. 4, lever supporting structure 44 includes a fulcrum supporting block 88 from which an upwardly extending fulcrum post 90, of circular cross section, extends. A bearing 92 is mounted to post 90.

The bearing 92 includes an inner race 94 adjacent the outer surface of fulcrum post 90 and an outer race 96.

A lever holder 98 is mounted, as by welds 100, to the outer race 96 to thereby journal the lever holder to the fulcrum post such that the lever is pivotable about the fulcrum axis 26. As shown in FIG. 4, holder 98 is comprised of first and second lever holding sections 102, 104. Each of these sections has a respective internal slide surface 106, 108 which slides against the adjacent surface of lever section 30 during shifting of the transmission. In addition, each of the holding sections 102, 104 also has a respective upper lip 110, 112, which assists in retaining the lever assembly in place. A mouth 113 (FIG. 2) is provided between the lips 110, 112 and opens at the end of the lever holder closest to the post 82. The lips 110, 112 are joined by a bridging section 115 opposite mouth 113. This mouth is of a dimension which is wider than the post 82. Consequently, for a zero drive output the holder 98 can be moved along the lever assembly until the fulcrum pivot axis 26 is aligned with the pivot axis 52. During this shifting, the post 82 enters the mouth between lips 110, 112. In this case, the output rack 14 remains stationary even as the lever assembly is oscillating.

The lever support structure 44 includes an elongated fulcrum supporting base 114 with an upwardly projecting rail 116 along its length. Rail 116 is of an inverted T-shaped cross section. The fulcrum block 88 has a rail receiving channel 118 of a cross section, corresponding in shape to the rail cross section. Thus, when the fulcrum block 88 is mounted to the fulcrum supporting base 114, the block is slidable along rail 116 and is retained in place on the rail. Stops, such as 122 in FIG. 1, limit the travel of the fulcrum block along the rail.

To adjust the power transmission, the drive mechanism 46 is designed to shift the fulcrum block 88 along rail 116 to thereby adjust the relative dimensions of the distances $d_1$ and $d_2$. This mechanism can comprise a slide lever and knob 118 which is rigidly connected to fulcrum block 88 and movable in the directions indicated by arrow 120 in FIG. 1. Again, as the fulcrum block is shifted by rod 118, the distances $d_1$ and $d_2$ vary relative to one another so as to change the throw of the outer end portion 36 of the lever section 32. By adjusting the length of the lever assembly, the maximum $d_2$ to $d_1$ ratio can be increased to achieve 1 to 1, 2 to 1, and 3 to 1 and higher output drive ratios if desired.

It should be noted that in a typical application, cam 12 has a cardiodal-shaped half section and a sinusoidal-shaped half section. Driving of the cam follower 40 occurs as the cardiodal-shaped section engages the cam follower. Of course, double cardiodal cams and other forms of cams may also be used. In addition, another cam follower 40' is indicated in dashed lines in FIG. 3. This cam follower is coupled to another lever assembly such as that previously described. Consequently, a smoother output is provided by the transmission under such circumstances as the cam followers 40 and 40' are cooperatively driven by the cam. That is, as one cam follower is driven by the cardiodal section of the cam, the other cam follower is engaged by the sinusoidal section of the cam, and vice versa.

Thus, the power transmission apparatus in accordance with the invention has the capacity to smoothly and continuously vary the output speed of an output shaft over a wide range of from zero revolutions per minute to higher levels. This apparatus is further capable of providing high output torque at low output speeds of the output shaft.

Having illustrated and described the principles of my invention with reference to one preferred embodiment, it should be apparent to those persons skilled in the art that such invention may be modified in arrangement and detail without departing from such principles.

I claim as my invention all such modifications as come within the true spirit and scope of the following claims:

1. A power transmission apparatus for transmitting power from a rotatable cam to an output mechanism comprising:
   lever support means;
   lever means having lever sections, the first lever section having a first lever first end portion and a second cam following end portion, the second lever section having a second lever first end section and a second output end portion, the respective first end portions being interconnected such that the length of the lever means is variable, the cam following end portion being adapted for coupling to and driving by the cam, and the output end portion being adapted for coupling to and driving the output mechanism;
   fulcrum means for pivoting said lever means to the lever support means such that the lever means reciprocates when the cam following end portion is driven by the cam and the length of the lever means varies as the cam following end portion is driven;
   drive adjustment means for moving the fulcrum means relative to the cam following and output end portions of the lever means to vary the throw of the output end portion of the second lever section resulting from reciprocations of the lever means; and
   biasing means for biasing the cam following and output end portions of the first and second lever sections away from one another.

2. A power transmission means according to claim 1 in which the output mechanism comprises a reciprocable rack means and the apparatus includes means for pivoting the rack means to the output end portion of the second lever means.

3. A power transmission according to claim 1 in which the lever means includes first and second lever sections with respective first end portions which are slidably interconnected.

4. A power transmission apparatus according to claim 1 in which the lever means includes first and second lever sections which are telescopingly interconnected.

5. A power transmission apparatus according to claim 1 in which the first and second lever sections each comprise a rigid straight tubular lever section.

6. A power transmission apparatus according to claim 1 in which the lever means includes first and second telescopingly interconnected lever sections, one of the first and second lever sections being pivoted to the fulcrum means to thereby pivot the lever means to the fulcrum means, and the fulcrum means being slidably mounted to the lever support means.

7. A power transmission apparatus according to claim 6 in which the lever support means has a base and an elongated fulcrum block supporting rail projecting outwardly from the base, the fulcrum means including a fulcrum supporting block for supporting the fulcrum, the fulcrum supporting block having a rail receiving channel which slidably receives the rail.

8. A power transmission apparatus according to claim 7 in which the rail is of a T-shaped cross section and the channel is of a corresponding cross section.

9. A power transmission apparatus for transmitting power from a rotatable cam to an output mechanism comprising:
   lever support means;
   lever means having lever sections, the first lever section having a first lever first end portion and a second cam following end portion, the second lever section having a second lever first end section and a second output end portion, the respective first end portions being interconnected such that the length of the lever means is variable, the cam following end portion being adapted for coupling to and driving by the cam, and the output end portion being adapted for coupling to and driving the output mechanism;
   fulcrum means for pivoting said lever means to the lever support means such that the lever means reciprocates when the cam following end portion is driven by the cam and the length of the lever means varies as the cam following end portion is driven;
   drive adjustment means for moving the fulcrum means relative to the cam following and output end portions of the lever means to vary the throw of the output end portion of the second lever section resulting from reciprocations of the lever means;
   the lever means including first and second lever sections which are telescopingly interconnected, and in which the first end portions of the first and second lever sections define an internal chamber, the apparatus including biasing means within the internal chamber for biasing the cam following and output end portions of the first and second lever sections away from one another.

10. A power transmission apparatus according to claim 9 in which the biasing means comprises a coil spring.

11. A power transmission apparatus for transmitting power from a rotatable cam to an output mechanism comprising:
    lever support means;
    lever means having lever sections, the first lever section having a first lever first end portion and a second cam following end portion, the second lever section having a second lever first end section and a second output end portion, the respective first end portions being interconnected such that the length of the lever means is variable, the cam following end portion being adapted for coupling to and driving by the cam, and the output end portion being adapted for coupling to and driving the output mechanism;
    fulcrum means for pivoting said lever means to the lever support means such that the lever means reciprocates when the cam following end portion is driven by the cam and the length of the lever means varies as the cam following end portion is driven;
    drive adjustment means for moving the fulcrum means relative to the cam following and output end portions of the lever means to vary the throw of the output end portion of the second lever section resulting from reciprocations of the lever means; and means for restricting the travel of the cam following portion of the first lever section to a first line and means for restricting the travel of the output end portion of the second lever section to a second line parallel to and spaced from the first line.

12. A power transmission apparatus according to claim 11 in which the first line is parallel to the plane of rotation of the cam and the lever means is angled outwardly from the plane of rotation of the cam.

13. A power transmission means according to claim 12 in which the output mechanism comprises a reciprocable rack means, the apparatus includes means for pivoting the rack means to the output end portion of the second lever means, and means for restricting the travel of the rack means in the direction of the second line.

14. A power transmission apparatus for transmitting power from a rotatable cam to an output mechanism comprising:

lever support means;

lever means having first and second lever sections, the first lever section having a first lever first end portion and a second cam following end portion, the second lever section having a second lever first end section and a second output end portion, the respective first end portions being slidably interconnected such that the length of the lever means is variable, the cam following end portion being adapted for coupling to and driving by the cam, and the output end portion being adapted for coupling to and driving the output mechanism;

means for restricting the travel of the cam following portion of the first lever section to a first line and means for restricting the travel of the output end portion of the second lever section to a second line parallel to and spaced from the first line;

the output mechanism comprising a reciprocable rack means, the apparatus including means for pivoting the rack means to the output end portion of the second lever means for pivoting about an output pivot axis;

fulcrum means for pivoting said lever means to the lever support means for pivoting about a fulcrum pivot axis such that the lever means oscillates when the cam following end portion is driven by the cam and the length of the lever means varies as the cam following end portion is driven; and drive adjustment means for moving the fulcrum means relative to the cam following and output end portions of the lever means to vary the throw of the output end portion of the second lever section resulting from reciprocations of the lever means.

15. A power transmission apparatus according to claim 14 in which the fulcrum means comprises means movable by the drive adjustment means to a position in which the fulcrum pivot axis is aligned with the output pivot axis for zero output drive.

16. A power transmission apparatus according to claim 14 in which the lever support means has a base and an elongated fulcrum block supporting rail projecting outwardly from the base, the fulcrum means including a fulcrum supporting block for supporting the fulcrum, the fulcrum supporting block having a rail receiving channel which slidably receives the rail.

17. A power transmission apparatus for transmitting power from a rotatable cam to an output mechanism comprising:

lever support means;

lever means having first and second lever sections, the first lever section having a first lever first end portion and a second cam following end portion, the second lever section having a second lever first end section and a second output end portion, the respective first end portions being telecopingly interconnected such that the length of the lever means is variable, the cam following end portion being adapted for coupling to and driving by the cam, and the output end portion being adapted for coupling to and driving the output mechanism;

means for restricting the travel of the cam following portion of the first lever section to a first line and means for restricting the travel of the output end portion of the second lever section to a second line parallel to and spaced from the first line, the first line being parallel to the plane of rotation of the cam and the lever means being angled outwardly from the plane of rotation of the cam;

the first and second lever sections defining an internal chamber, the apparatus including biasing means within the internal chamber for biasing the cam following and output end portions of the first and second lever sections away from one another;

fulcrum means for pivoting said lever means to the lever support means for pivoting about a fulcrum pivot axis such that the lever means oscillates when the cam following end portion is driven by the cam and the length of the lever means varies as the cam following end portion is driven; and drive adjustment means for moving the fulcrum means relative to the cam following and output end portions of the lever means to vary the throw of the output end portion of the second lever section resulting from reciprocations of the lever means.

18. A power transmission apparatus according to claim 17 in which the output mechanism comprises a reciprocable rack means, the apparatus including means for pivoting the rack means to the output end portion of the second lever means for pivoting about an output pivot axis, and in which the fulcrum means comprises means movable by the drive adjustment means to a zero drive position in which the fulcrum pivot axis is aligned with the output pivot axis for zero output drive.

19. A power transmission apparatus according to claim 18 in which the lever support means has a base and an elongated fulcrum block supporting rail projecting outwardly from the base, the fulcrum means including a fulcrum supporting block for supporting the fulcrum, the fulcrum supporting block having a rail receiving channel which slidably receives the rail.

20. A power transmission apparatus according to claim 19 in which the means for pivoting the rack means to the output end portion of the second lever means comprises an output pivot post, the lever support means including a lever holder pivotally mounted to the fulcrum and slidably coupled to the second lever section, the lever holder including a mouth into which the output pivot post slides as the fulcrum means is slid to the zero drive position.

21. A power transmission apparatus according to claim 17 in which the first and second lever sections each comprise a respective rigid straight tubular lever section.

* * * * *